United States Patent [19]

Dorogy, Jr. et al.

[11] Patent Number: 5,367,046

[45] Date of Patent: Nov. 22, 1994

[54] LOW DIELECTRIC POLYIMIDE FIBERS

[75] Inventors: William E. Dorogy, Jr., Newport News; Anne K. St. Clair, Poquoson, both of Va.

[73] Assignee: The United States of America as represented by the Administrator of the National Aeronautics and Space Administration, Washington, D.C.

[21] Appl. No.: 870,003

[22] Filed: Apr. 10, 1992

[51] Int. Cl.$^5$ .................. C08G 73/12; B32B 27/02; B29C 47/88; D01F 6/00

[52] U.S. Cl. .................. 528/353; 428/364; 428/394; 428/395; 264/178 F; 264/183; 264/184; 264/197; 264/205; 264/211.14; 264/211.16; 264/211.17

[58] Field of Search ............... 528/353; 428/364, 394, 428/395; 264/183, 184, 197, 178 F, 211.14, 211.17, 211.16, 205

[56] References Cited

PUBLICATIONS

A. K. St. Clair et al, *Proc. Polymr. Mater. Sci. Eng.*, 59, 28–32 (Sep. 1988).

A. K. St. Clair et al, *Proc. Polymr. Sci. Eng.*, 59, 1177–1181 (1988). The month of publication for this reference is not available.

A. K. St. Clair et al, *Recent Advances in Polyimides*, Weber and Gupta, eds., Plenum Press, New York, pp. 16, 17 (1987). The month of publication for this reference is not available.

*Primary Examiner*—John Kight, III
*Assistant Examiner*—P. Hampton-Hightower
*Attorney, Agent, or Firm*—George F. Helfrich

[57] ABSTRACT

A high temperature resistant fiber, especially a polyimide fiber, having a dielectric constant less than 3 is prepared by first reacting 2,2-bis[4-(4-aminophenoxy)-phenyl]hexafluoropropane with 2,2-bis(3,4-dicarboxyphenyl)hexafluoropropane dianhydride in an aprotic solvent to form a polyamic acid resin solution. The polyamic acid resin solution is then extruded into a coagulation medium to form polyamic acid fibers, which are thermally cured to their polyimide form. Alternatively, 2,2-bis[4-(4-aminophenoxy)phenyl]hexafluoropropane with 2,2-bis(3,4-dicarboxyphenyl)hexafluoropropane dianhydride to form a polyamic acid, and the polyamic acid is chemically converted to its polyimide form. The polyimide is then dissolved in a solvent to form a polyimide resin solution, and the polyimide resin is extruded into a coagulation medium to form a polyimide wet gel filament. In order to obtain polyimide fibers of increased tensile properties, the polyimide wet gel filaments are stretched at elevated temperatures. Tensile properties of the fibers were measured and found to be in the range of standard textile fibers. Polyimide fibers obtained by either method will have a dielectric constant similar to that of the corresponding polymer, viz., less than 3 at 10 GHz.

10 Claims, 3 Drawing Sheets

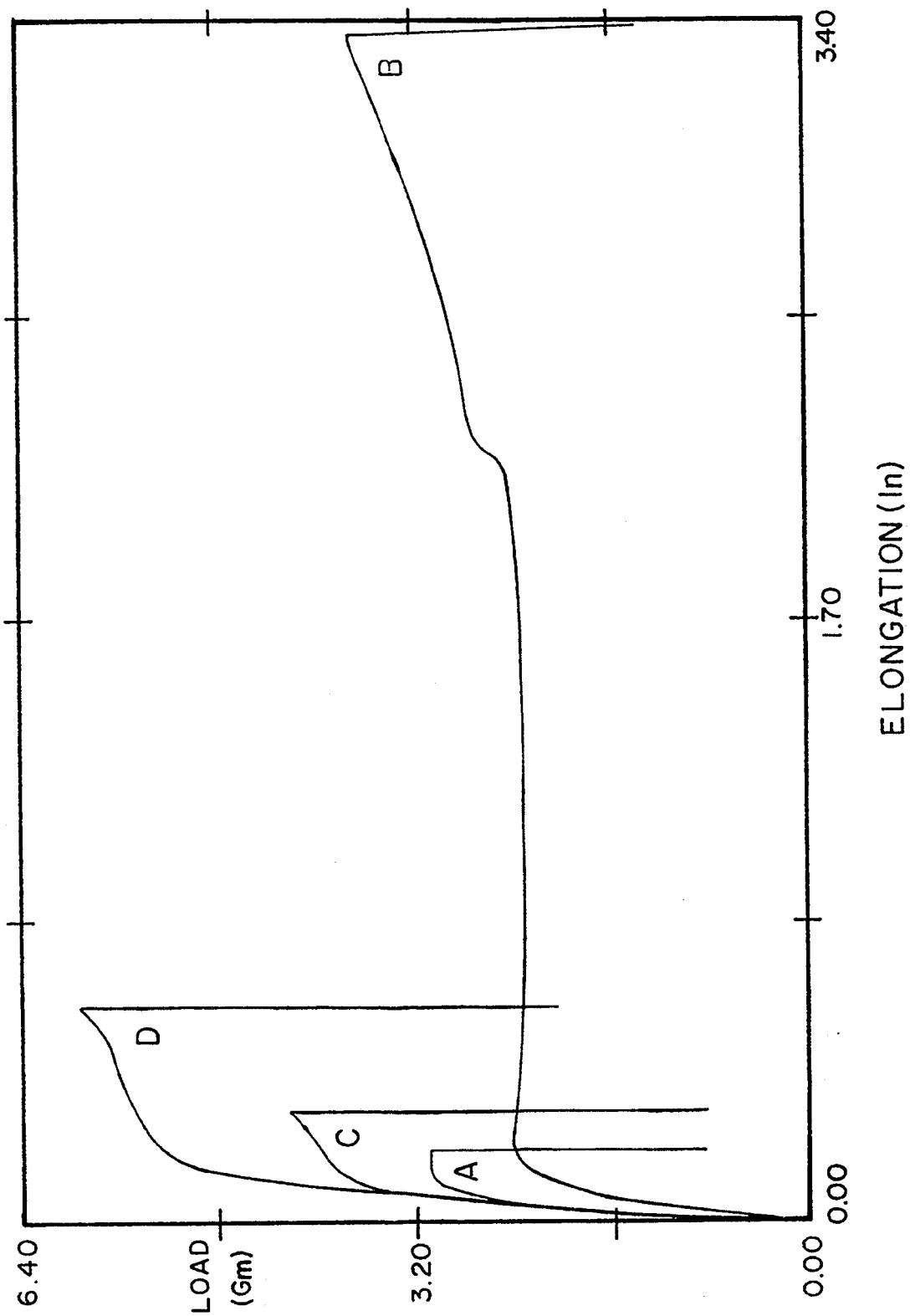

LOW DIELECTRIC POLYIMIDE FIBERS

ORIGIN OF THE INVENTION

The invention described herein was made jointly in the performance of work under a NASA contract and by a Government employee, and is subject to the provisions of Section 305 of the National Aeronautics and Space Act of 1958, as amended, Public Law 85-568, (72 Star. 435; 42 USC 2457).

BACKGROUND OF THE INVENTION

1. Field of the Invention

This invention relates to fibers, especially polyimide fibers, having a dielectric constant below 3, as well as excellent thermal stability and tensile properties within the range of standard textile fibers. It relates also to a process for producing such fibers by wet spinning polyimide or polyamic acid solutions, especially fluorine-containing aromatic polyimide or polyamic acid solutions.

2. Description of the Related Art

The need for materials having a low dielectric constant (below 3) has grown in the aerospace and electronic industries in recent years. These materials find use as coatings, films, matrix resins, and fibers in various applications.

Several types of fibers have been employed in the construction of low dielectric composites. SPECTRA ®, produced by Allied-Signal, has a dielectric constant of 2.35 (data sheet from Allied-Signal). However, a melting point of 147° C. [Chem. & Eng. News, 24, Oct. 9, 1989] prohibits its use in high temperature applications. Silicon carbide fibers, NICALON ™ from Dow Corning, retain their tensile properties at elevated temperatures, but they have a dielectric constant of 6.4 at 9.4 GHz (Dow Corning product bulletin). Ceramic fibers such as NEXTEL ®, from 3M, can be used at elevated temperatures and have a slightly lower dielectric constant of 5.0 at 1 GHz (3M product bulletin). Glass and KEVLAR ® (from Du Pont) fibers are used in high temperature applications and exhibit dielectric constants of 3.6-5.8 and 3.7, respectively [SAMPE Quarterly, Apr. 27, 1979]. Quartz fibers, ASTROQUARTZ ® II from J. P. Stevens & Co., have use temperatures up to 1050° C. and a dielectric constant of 3.78 at 1 MHz (J. P. Stevens Products/Data/Price list). Polybenzimidazole fibers, from Hoechst Celanese Corp., have high temperature resistance (glass transition temp. of 425° C.) and a dielectric constant of 3.3 at 0.1 MHz (Celanese PBI product bulletin). A high temperature resistant fiber with a dielectric constant less than 3 is not reported in the literature.

SUMMARY OF THE INVENTION

A primary object of the present invention is to provide fibers, especially polyimide fibers, and more particularly fluorine-containing aromatic polyimide fibers, having a dielectric constant below 3, excellent thermal stability, and tensile properties in the range of standard textile fibers.

Another primary object of the present invention is to provide a process for the production of fibers, especially polyimide fibers, and more particularly fluorine-containing aromatic polyimide fibers having a dielectric constant below 3, excellent thermal stability, and tensile properties in the range of standard textile fibers.

By the present invention, low dielectric fibers, especially low dielectric aromatic polyimide fibers, were produced by extrusion of solutions (e.g., DMAc solutions) of either an aromatic polyimide or an aromatic polyamic acid, especially one derived from 2,2-bis(3,4-dicarboxyphenyl)hexafluoropropane dianhydride (6FDA) and 2,2-bis[4-(4-aminophenoxy)phenyl]hexafluoropropane (4BDAF), into an aqueous organic medium. Media investigated consisted of 20-31% aqueous N,N-dimethylacetamide (DMAc), 70% or 80% aqueous ethanol (EtOH), and 69-71% aqueous ethylene glycol (EtG). Different filament cross-sectional shapes were obtained depending upon whether polyamic acid or polyimide solutions were extruded. Polyimide fibers obtained by the thermal conversion of polyamic acid fibers were found to exhibit enhanced tensile properties compared to the original precursor fiber. A chemical conversion of the polyamic acid fiber to its polyimide form can also be carried out. Polyimide fibers with increased tensile properties were produced by stretching the polyimide wet gel filament at 288° C. It is anticipated that these aromatic polyimide fibers will be useful for both industrial and aerospace applications requiring fibers with a dielectric constant below 3, high thermal stability and tensile properties in the range of standard textile fibers.

Conversion of the polyamic acid fiber to its polyimide form is required in order to obtain a dielectric constant below 3, achieve high thermal stability, and increase the tensile properties of the fiber. The production of fibers directly from polyimide solutions reduces the number of steps in the process and enables drawing of the wet gel filament at elevated temperatures. This heat treatment of the polyimide wet gel filament increases the tensile properties of the resulting fiber.

Although the present invention specifies the polyamic acid and polyimide derived from 6FDA and 4BDAF, other monomers which yield polyimides exhibiting dielectric constants below 3 and having high thermal stability are also extruded into filaments by adjusting the process conditions. In light of the present invention, the dielectric constant of these organic polymer systems is determined by the nature of the polymer, and fibers thereof have a dielectric constant the same as or less than that of the polymer because of the presence of macropores within the fiber. Other solvents in addition to DMAc are also used to form polyamic acid and polyimide solutions for the fiber spinning process. Alternative coagulation media, in addition to the ones specifically reported herein, are also used as long as the resulting filaments have enough strength to be processed.

BRIEF DESCRIPTION OF THE DRAWINGS

FIG. 2 shows drawings of filament cross-sections made from scanning electron microscopy (SEM) photos of fractured fiber ends;

FIG. 3 shows typical stress/strain curves for fibers produced using a 71% aqueous EtG coagulation bath. Curve A was obtained from a polyamic acid fiber. Curve B is the curve of a polyimide fiber obtained by the thermal conversion of fibers of curve A at constant length. Curve C was obtained from a polyimide fiber produced by the extrusion of a DMAc solution of the polyimide into 71% aqueous EtG. Curve D is the curve for a polyimide fiber produced as in curve C except that the polyimide wet gel filament was stretched 2.3× at 289° C.

DESCRIPTION OF THE PREFERRED EMBODIMENTS

The synthetic procedure for the preparation of polyimides employed in the present invention, especially a 6FDAJ4BDAF polyimide, involved production of the polyamic acid and subsequent chemical imidization to the polyimide form. Polyamic acid polymers had inherent viscosities between 1.48 and 2.1 dl/g, and their DMAc solutions contained 15.0% solids (w/w). Polyimide polymers exhibited inherent viscosities that ranged from 1.25 to 1.52 dl/g and their DMAc solutions contained between 15.0 and 17.5% solids (w/w).

Figure 1:
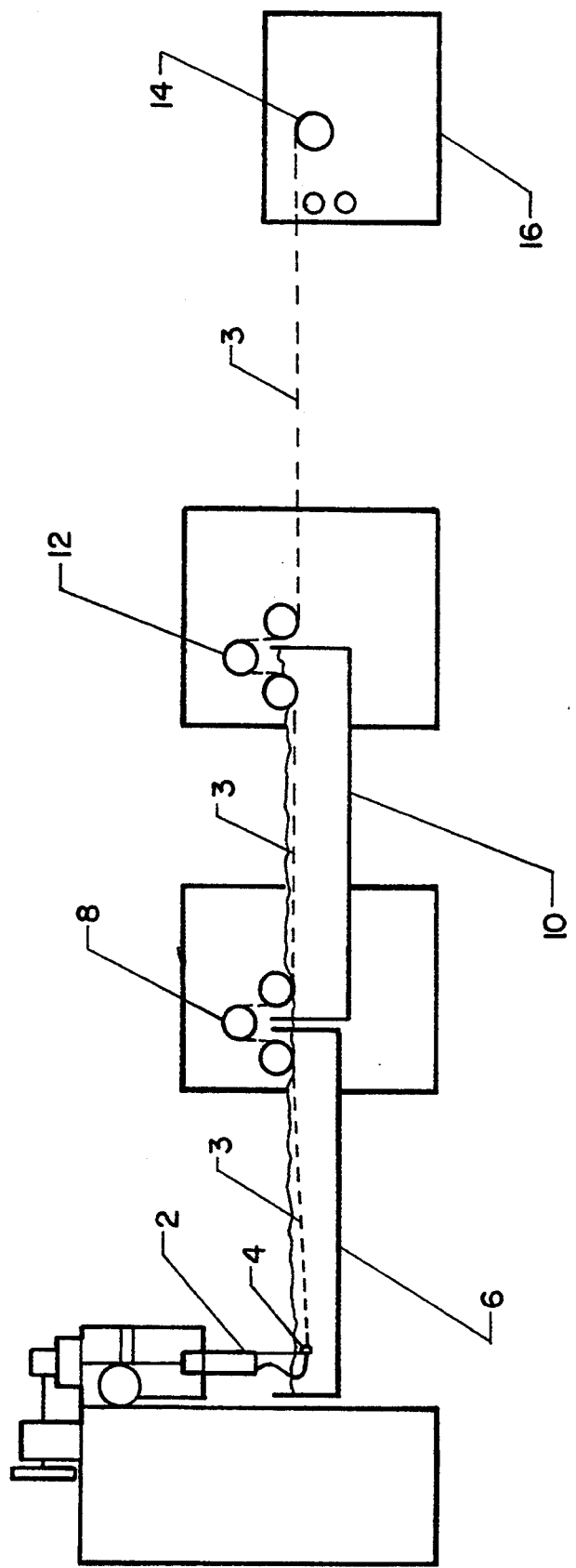
FIG. 1 is a schematic showing the fiber wet spinning process according to the present invention.

Polyamic acid and polyimide fibers were produced using the process shown in FIG. 1. The polyamic acid or polyimide solution was poured into the stainless steel extrusion cylinder/piston assembly 2 and extruded through a spinnerotto 4 immersed in a liquid coagulation bath 6. The solidifying filament 3 was drawn through the coagulation bath 6 and onto a first set of cluster rolls 8. The filament 3 then traveled through a water wash bath 10, over a second set of cluster rolls 12, and onto a pyrex spool 14 on winder 16. Filaments 3 collected on the spool 14 that have not been dried are termed "wet gel". Stretching of the polyimide wet gel filaments was carried out by inserting a channeled-block furnace (not shown in FIG. 1) between the second set of cluster rolls 12 and the winder 16 so that as the filament passed through the furnace, the surface speed differential between the second set of cluster rolls 12 and the spool 14 was increased while the furnace was at an elevated temperature. Drying of the wet gel polyamic acid and polyimide filaments to fiber form was carried out using a vacuum oven at approximately 80° C. Polyamic acid fibers were further thermally converted to polyimide fibers by heating for one hour each at 100°, 200°, and 300° C. using a forced air oven, while remaining wound around a pyrex spool. An alternative process involves the chemical conversion of the polyamic acid fiber to polyimide fiber.

Although the present invention specifies the polyamic acid and polyimide dedved from 6FDA and 4BDAF, other polyimides having dielectric constants below 3 can be extruded into filament form using the wet spinning techniques described herein.

Aqueous solutions of N,N-dimethylacetamide (DMAc), ethanol (EtOH), and ethylene glycol (EtG) were used as coagulation media in the present work. Filaments were produced by the extrusion of polyamic acid/DMAc solutions into either 70% aqueous EtOH or 69-71% aqueous EtG. Polyimide/DMAc solutions produced filaments when extruded into either 20-31% aqueous DMAc, 70% or 80% aqueous EtOH or 69-71% aqueous EtG. A value of 70% aqueous EtOH signifies 70 grams EtOH mixed with 30 grams water. Although the fibers of this present invention were produced by extruding into coagulation media of the above concentrations, other concentration ranges can be used, as is understood by those of skill in the art.

Factors such as coagulation bath temperature, concentration and temperature of the wash bath, and wet gel drying conditions are known to affect the structure and properties of the fiber. Coagulation bath temperatures ranged from 7° to 21° C., with the majority of the work being carried out at 20° to 21° C. Water was used in the wash bath at temperature between 30° and 51° C., with most of the research at temperatures of 30°-31° C. Polyamic acid fibers were produced using coagulation bath temperatures of 19°-20° C. and wash bath temperatures between 30° and 31° C. in order to minimize the possibility of hydrolysis. Wet gel filaments were vacuum dried (30 inches of Hg) at approximately 80° C. for between 14-18 hours in order to give good fiber collapse.

Figure 2A:
FIG. 2A is a polyamic acid fiber produced using a 71% aqueous ethylene glycol (EtG) coagulation bath.
Figure 2B:
FIG. 2B is a polyimide fiber produced by the extrusion of an N,N-dimethylacetamide (DMAc) solution of the polyimide into 71% aqueous EtG.

Filament diameter, cross-sectional shape, and microscopic features were determined by the visual inspection of at least six fractured fiber ends using either an optical or scanning electron microscope (SEM). Polyamic acid resins yielded round or oval cross-sectional shaped filaments when extruded into 70% aqueous EtOH or 69-71% aqueous EtG (FIG. 2A). Extrusion of polyimide solutions into 20-31% aqueous DMAc, or 70% or 80% aqueous EtOH, or 69-71% aqueous EtG resulted in fibers with an elongated oval and dumbbell or "C" cross-sectional shape, respectively (FIG. 2B). Filament diameters are reported in Table 1 below as an average with its coefficient of variation (COV). The COV is calculated by dividing the standard deviation by the arithmetic means and multiplying by 100, with its units being %. The fibers generally contained some macropores, with the concentration of solid core fibers represented as % solid fibers. A value such as 60% solid fibers signifies that six out of ten fractured fiber ends were solid, containing no macropores or voids. All fracture fiber ends showed an internal structure exhibiting a cheesy-granular appearance.

Tensile properties of both polyamic acid and polyimide fibers produced using 71% aqueous EtG were measured and are listed in Table 1, with the yield point determined by a zero slope method. Polyamic acid fibers were thermally converted to the polyimide while wrapped around a pyrex spool. This process can be considered a thermal treatment with the fiber at fixed length, and any fiber shrinkage at these elevated temperatures would impart orientation in the fiber similar to that experienced during stretching or drawing, resulting in increased tensile properties. Polyimide fibers produced directly from a polyimide solution without exposure or stretching at elevated temperatures had the lowest tensile properties, due possible to residual solvent or non-solvent remaining within the fiber structure, as well as a large fiber diameter. The highest tensile properties were exhibited by polyimide fibers produced from polyimide wet gel filaments that were stretched at 288°-289° C., with the tensile properties increasing with stretch ratio. By the present invention, polyimide fibers, have been produced exhibiting tensile properties in the range of standard textile fibers.

TABLE I

| | 6FDA/4BDAF Fiber Tensile Properties[a] | | |
|---|---|---|---|
| | Produced from Polyamic Acid Solution | | |
| | Polyamic Acid Fibers | Polyimide Fibers | Polyimide Fibers Produced from a Polyimide Solution |
| Wash Bath Stretch | 1.2 | — | 1.2 | 1.2 |
| Winder Stretch[b] | 1.1 | — | — | 2.3 |

TABLE I-continued

6FDA/4BDAF Fiber Tensile Properties[a]

| | Produced from Polyamic Acid Solution | | Polyimide Fibers Produced from a Polyimide Solution | |
|---|---|---|---|---|
| | Polyamic Acid Fibers | Polyimide Fibers | | |
| Winder Stretch Temperature | Ambient | — | Ambient | 289° C. |
| Fiber Cross-Section | Round | Round | "C" Shape | Dumbbell |
| Fiber Diameter (microns) | 21 (7.7%)[c] | 17 (19%) | 35 (7.4%) | 18 (8.2%) |
| % Solid Fibers | 46 | — | 13 | 0 |
| Breaking Tenacity (ksi) | 12.6 (4.0%)[c] | 23.1 (15%) | 6.1 (4.1%) | 35.7 (3.3%) |
| % Elongation to Break | 7.2 (39%)[c] | 106 (17%) | 9.3 (29%) | 22 (8.5%) |
| Initial Modulus (ksi) | 488 (3.2%)[c] | 434 (2.6%) | 183 (2.4%) | 766 (2.2%) |
| Yield Point (ksi) | 12.4 (3.5%)[c] | 14.9 (5.8%) | 5.9 (5.1%) | 31.1 (2.1%) |

[a]Produced using a 71% aqueous EtG coagulation bath.
[b]Stretch applied between second cluster rolls and winder spool.
[c]Coefficient of variation in parenthesis.

Thermal gravimetric analysis (TGA) was performed on polyimide fibers produced by the extrusion of a polyimide solution into 71% aqueous EtG and subsequent stretching of that wet gel filament 2.3× at 289° C. The polyimide fibers exhibited less than a two percent weight loss below 400° C., a ten percent weight loss at 478.2° C., and a fifty percent weight loss at 528.1° C. Values are indicative of a polymeric material possessing a high thermal stability.

Polyamic acid fibers were produced from DMAc solutions of the polyamic acid using 70% aqueous EtCH and 69–71% aqueous EtG. Conversion of the polyamic acid to polyimide fiber form was accomplished by thermal means. Polyimide fibers were also produced by the extrusion of DMAc solutions of the polyimide into 20–31% aqueous DMAc, 70% or 80% aqueous ETCH, and 69–71% aqueous EtG. Stretching of the polyimide wet gel filament was carried out at approximately 288° C. with the resulting fibers having increased tensile properties, increasing with stretch ratio. These polyimide fibers have a dielectric constant below 3, exhibit high thermal stability, and tensile properties in the range of standard textile fibers.

Although the polyamic acid and polyimide fibers of the present invention were derived from 6FDA and 4BDAF, other polyimides exhibiting dielectric constants below 3, high thermal stability, and fiber-forming tendencies could foreseeably be extruded into filaments using the wet spinning techniques described herein. Other solvents in addition to DMAc may be used to form polyamic acid and polyimide solutions for the fiber spinning process. An alternative process for the formation of polyimide solutions would involve the thermal conversion of the polyamic acid to polyimide followed by dissolution in the appropriate solvent. Coagulation bath compositions and concentrations employed in the production of polyamic acid and polyimide fibers in other systems may foreseeable be used to produce 6FDA/4BDAF fibers. Conversions of polyamic acid to polyimide fibers may be carried out using chemical means in addition to the thermal process specified herein.

SPECIFIC EXAMPLES

Example 1

To a 500 ml resin kettle was added 32.8703 grams (63.400 mmoles) of 2,2-bis[4-(4-aminophenoxy)phenyl]-hexafluoropropane (4BDAF) and most of the 345.8667 grams of N,N-dimethylacetamide (DMAc). The kettle was purged with dry nitrogen, and stirring was begun and continued until all the 4BDAF dissolved. A total of 28.2983 grams (63.701 mmoles) of 2,2-bis(3,4-dicarboxyphenyl)hexafluoropropane dianhydride (6FDA) was added at a steady but moderate rate, with any residual 6FDA being washed into the resin kettle using the remaining DMAc. The reaction vessel was again purged with dry nitrogen, and stirring was resumed. A large amount of heat was initially evolved, and stirring was continued for four hours under a constant flow of dry nitrogen. The inherent viscosity of the resulting polyamic acid was determined to be 1.79 dl/g at 35° C. The 6FDA/4BDAF polyamic acid solution (15.0% solids) was stored in a freezer until used.

The resin solution was poured into the extrusion cylinder/piston assembly and allowed to stand at ambient temperature until all the entrapped air migrated out of the solution. The remaining parts of the extrusion assembly and spinnerette (one hole with 100 micron diameter) were attached, and resin was extruded at a rate of 0.058 cc/min for several minutes to remove any residual air in the system. The spinnerette was then immersed in a 71% aqueous ethylene glycol (EtG) coagulation bath which was kept at 20.0°–20.2° C. The solidifying filament was grasped using tweezers, drawn through the bath, and onto a first set of cluster rolls, operating at a surface speed of 59–63 fpm. The wet gel filament then traveled through a water wash bath (at 30.4°–30.5° C.), onto a second set of cluster rolls (surface speed of 69–74 fpm), and was collected by wrapping around a removable pyrex spool on a winder (surface speed of 75–78 fpm). The spool of wet gel filaments was dried at about 80° C. in a vacuum oven for 14–18 hours. Examination of the fractured fiber ends revealed that the fiber had a round cross-sectional shape (FIG. 2A) with a diameter of 21 microns and % solid fiber value of 46. Single filament tensile properties were measured (curve A in FIG. 3) as follows: breaking tenacity of 12.6 ksi, initial modulus of 488 ksi, % elongation to break of 7.2 and yield point of 12.4 ksi.

EXAMPLE 2

Polyamic acid fibers, produced in Example 1, were thermally convened to their polyimide form by heating the spool of fibers in a forced air oven for one hour each at 100°, 200°, and 300° C. The polyimide fibers were found to have a round cross-sectional shape with a diameter of 17 microns. The fibers underwent severe deformation of their fracture ends and thus a % solid fiber value could not be determined. Single filament tensile properties were measured (curve B in FIG. 3) as follows: breaking tenacity of 23.1 ksi, initial modulus of 434 ksi, % elongation to break of 106, and yield point of 14.9 ksi.

EXAMPLE 3

The polyamic acid solution (100 grams), produced in Example 1, was poured into a large stainless steel syringe and slowly added to a stirred solution of 120.5 ml pyridine and 120.5 ml acetic anhydride in a 500 ml 3-necked flask. The flask was continuously purged with dry nitrogen during the resin addition. The reaction mixture was heated to 65° C. for three hours after completion of the resin addition, and then allowed to slowly cool to ambient temperature. The solution was poured into a 500 ml separatory funnel and slowly added to water, stirred in a quart blender, in order to precipitate the polyimide. The precipitate was washed with fresh water several times and collected by suction filtration using a fritted-glass Büchner funnel. The polyimide solid was vacuum dried at 200° C. for three hours, after which the heat was turned off, and the oven was allowed to slowly cool to ambient temperature under vacuum. The resulting polyimide had an inherent viscosity of 1.52 dl/g at 35° C., and was dissolved in DMAc such that a solution with 15.0% solids was obtained (refrigerated until used).

Production of polyimide filaments was carried out by extrusion of the polyimide solution into 71% aqueous EtG in a manner similar to Example 1, with the following experimental conditions:

| Resin extrusion rate | 0.073 cc/min |
| --- | --- |
| Resin temperature | 26-27° C. |
| Coagulation bath temperature | 20.2-20.4° C. |
| First cluster roll speed | 49-52 fpm |
| Wash bath temperature | 30.9° C. |
| Second cluster roll speed | 59-62 fpm |
| Winder spool speed | 60-63 fpm. |

The spoof of wet gel polyimide filaments was vacuum dried at approximately 80° C. for 14-18 hours. Examination of the fractured fiber ends showed a "C" shaped cross-section (FIG. 2B) with a cross-sectional area of 990 microns$^2$ corresponding to a diameter of 35 microns and a % solid fiber value of 13. Single filament tensile properties were measured (curve C, FIG. 3) as follows: breaking tenacity of 6.1 ksi, initial modulus of 183 ksi, % elongation to break of 9.3, and yield point of 5.9 ksi.

EXAMPLE 4

Production of polyimide filaments was carried out in a manner similar to Example 3, with the following conditions:

| Resin inherent viscosity | 1.52 dl/g |
| --- | --- |
| Resin % solids | 15.0 |
| Resin extrusion rate | 0.061 cc/min |
| Resin temperature | 25° C. |
| Coagulation bath concentration | 71% aqueous EtG |
| Coagulation bath temperature | 20.4-20.5° C. |
| First cluster roll speed | 29-31 fpm |
| Wash bath temperature | 30.8° C. |
| Second cluster roll speed | 34-36 fpm |
| Furnace temperature | 288-289° C. |
| Winder spool speed | 39-41 fpm. |

A channeled-block furnace was inserted between the second set of cluster rolls and the winder such that the filament was stretched at 288°289° C. as it passed through the furnace. The spool of polyimide filaments was vacuum dried at approximately 80° C. for 14-18 hours. Examination of the fractured fiber ends revealed a dumbbell cross-sectional shape with a cross-sectional area of 370 microns$^2$ corresponding to a diameter of 22 microns and % solid fiber value of 0. Single filament tensile properties were determined as follows: breaking tenacity of 27.7 ksi, initial modulus of 672 ksi, % elongation to break of 54, and yield point of 21.5 ksi.

EXAMPLE 5

Production of polyimide filaments was carried out in a manner similar to Example 4, with the following experimental conditions:

| Resin inherent viscosity | 1.52 dl/g |
| --- | --- |
| Resin % solids | 15.0 |
| Resin extrusion rate | 0.061 cc/min |
| Resin temperature | 26.0° C. |
| Coagulation bath concentration | 71% aqueous EtG |
| Coagulation bath temperature | 20.5° C. |
| First cluster roll speed | 29-31 fpm |
| Wash bath temperature | 30.8° C. |
| Second cluster roll speed | 34-36 fpm |
| Furnace temperature | 289° C. |
| Winder spool speed | 79-82 fpm. |

The spool of filaments was vacuum dried at approximately 80° C. for 14-16 hours. Examination of fractured fiber ends showed a dumbbell cross-sectional shape with a cross-sectional area of 240 microns$^2$ corresponding to a diameter of 18 microns and % solid fiber value of 0. Single filament tensile properties were measured (curve D, FIG. 3) as follows: breaking tenacity of 35.7 ksi, initial modulus of 766 ksi, % elongation to break of 22, and yield point of 31.1 ksi. A TGA of the polyimide fibers, using air at a flow rate of 15.00 ml/min and 2.5° C./rain temperature increase rate, indicated less than a 2% weight loss below 400° C., a ten percent weight loss at 478.2° C., and a fifty percent weight loss at 528.1° C.

EXAMPLE 6

Production of polyimide fibers was carried out in a manner similar to Example 3, with the following experimental conditions:

| Resin inherent viscosity | 1.25 dl/g |
| --- | --- |
| Resin % solids | 17.5 |
| Resin extrusion rate | 0.081 cc/min |
| Resin temperature | 35° C. |
| Coagulation bath concentration | 70% aqueous EtOH |
| Coagulation bath temperature | 18.3-18.4° C. |
| First cluster roll speed | 48-50 fpm |
| Wash bath temperature | 30.4° C. |

Filaments were collected by wrapping them around the last roll of the first roll cluster, which was partially immersed in the wash bath. The polyimide filaments were vacuum dried at approximately 80° C. for between 14-16 hours. Examination of fractured fiber ends showed a "C" shaped cross-section with a cross-sectional area of 1540 microns$^2$ corresponding to a diameter of 44 microns and a % solid fiber value of 70.

EXAMPLE 7

Production of polyimide fibers was carried out in a manner similar to Example 3, with the following experimental conditions:

| Resin % solids | 15.0 |
| --- | --- |
| Resin extrusion rate | 0.20 cc/mm |
| Resin temperature | 23° C. |
| Coagulation bath concentration | 31% aqueous DMAc |
| Coagulation bath temperature | 20.5° C. |
| First cluster roll speed | 40 fpm |
| Wash bath temperature | 30.9° C. |
| Second cluster roll speed | 47 fpm |
| Winder spool speed | 50 fpm. |

The spool of filaments was vacuum dried at 80°–100° C. for between 14–18 hours. Examination of fractured fiber ends revealed an elongated oval cross-section with a cross-sectional area of 4390 microns$^2$ corresponding to a diameter of 75 microns and a % solid fiber value of 0.

The foregoing specific Examples are merely to illustrate the present invention in an exemplary fashion and are not intended, or to be interpreted, as exhaustive.

The specific polyamic acid or polyimide resin, coagulation medium composition and concentration, and other process conditions in the figures and tables and specific examples herein are also exemplary only and are intended merely to illustrate the process for the production of low dielectric polyimide fibers, having a dielectric constant below 3. It is to be understood that the use of these process conditions, including the various coagulation medium compositions and concentration, to achieve low dielectric polyimide fibers from other polyamic acid or polyimide polymers are considered within the scope of the present invention.

Thus, various modifications and variations in particular detail of the present invention will be apparent to those skilled in the art. It is therefore to be understood that, within the scope of the appended claims, the invention may be practiced otherwise than as specifically disclosed.

We claim:

1. A high temperature resistant, fluorine-containing aromatic polyimide fiber having a dielectric constant less than 3, wherein the fluorine-containing aromatic polyimide is prepared by reacting 2,2-bis[4-(4-aminophenoxy)phenyl]hexafluoropropane with 2,2-bis(3,4-dicarboxyphenyl) hexafluoropropane dianhydride followed by converting the polyamic acid so formed to the corresponding polyimide by standard means.

2. A process for producing polyimide fibers having a dielectric constant less than 3, which process comprises:
   (a) reacting 2,2-bis[4-(4-aminophenoxy)phenyl]hexafluoropropane with 2,2-bis(3,4-dicarboxyphenyl)-hexafluoropropane dianhydride in an aprotic solvent to form a polyamic acid resin solution;
   (b) extruding the polyamic acid resin solution into a coagulation medium to form polyamic acid fibers; and
   (c) thermally curing the polyamic acid fibers to their polyimide form.

3. The process according to claim 2, wherein the coagulation medium is selected from the group consisting of 70% aqueous ethanol and 69–71% aqueous ethylene glycol.

4. The process according to claim 2, wherein the thermal curing of polyamic acid fibers to polyimide fibers is accomplished using a thermal treatment of one hour at 100°, 200°, and 300° C.

5. A process for producing polyimide fibers having a dielectric constant less than 3, which process comprises:
   (a) reacting 2,2-bis[4-(4-aminophenoxy)phenyl]hexafluoropropane with 2,2-bis(3,4-dicarboxyphenyl)-hexafluoropropane dianhydride to form a polyamic acid;
   (b) chemically converting the polyamic acid to its polyimide form;
   (c) dissolving the polyimide in a solvent to form a polyimide resin solution; and
   (d) extruding the polyimide resin solution into a coagulation medium to form a polyimide wet gel filament.

6. The process according to claim 5, wherein the chemical conversion of the polyamic acid to its polyimide form is accomplished using acetic anhydride and pyridine.

7. The process according to claim 5, wherein the solvent used to form the polyimide resin solution is an aprotic solvent.

8. The process according to claim 5, wherein the coagulation medium is selected from the group consisting of 20–31% aqueous N.N-dimethylacetamide, 70% or 80% aqueous ethanol, and 69–71% ethylene glycol.

9. The process according to claim 5, wherein the polyimide wet gel filament is stretched at elevated temperatures in order to obtain polyimide fibers with increased tensile properties.

10. The process according to claim 9, wherein the polyimide wet gel filament is stretched 2.3× at 288°–289° C. in order to obtain polyimide fibers with increased tensile properties.

* * * * *